US012784779B2

(12) United States Patent
Usui et al.

(10) Patent No.: US 12,784,779 B2
(45) Date of Patent: Nov. 3, 2026

(54) COMPUTER-IMPLEMENTED METHOD FOR CONTROLLING AUDIO PROCESSING APPARATUS AND AUDIO PROCESSING APPARATUS

(71) Applicant: Yamaha Corporation, Hamamatsu (JP)

(72) Inventors: Atsushi Usui, Hamamatsu (JP); Masafumi Kanada, Hamamatsu (JP); Tomoyuki Hayashi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 187 days.

(21) Appl. No.: 18/769,564

(22) Filed: Jul. 11, 2024

(65) Prior Publication Data

US 2025/0022487 A1 Jan. 16, 2025

(30) Foreign Application Priority Data

Jul. 12, 2023 (JP) ................................ 2023-114491

(51) Int. Cl.
*G11B 27/031* (2006.01)
*G06F 3/04842* (2022.01)

(52) U.S. Cl.
CPC ........ *G11B 27/031* (2013.01); *G06F 3/04842* (2013.01)

(58) Field of Classification Search
CPC ........................................................ G06F 3/16
See application file for complete search history.

(56) References Cited

U.S. PATENT DOCUMENTS

2011/0235825 A1* 9/2011 Okabayashi ........... H04H 60/04 381/107
2016/0277857 A1 9/2016 Okabayashi
2020/0241831 A1* 7/2020 Takahashi .............. H04H 60/04

FOREIGN PATENT DOCUMENTS

JP 2016-178391 A 10/2016

* cited by examiner

*Primary Examiner* — Walter F Briney, III
(74) *Attorney, Agent, or Firm* — Crowell & Moring LLP

(57) ABSTRACT

An audio processing apparatus includes at least one processor configured to execute instructions to adjust a first-audio signal depending on a first parameter to generate a first-signal; adjust the first-audio signal depending on a second parameter to generate a second-signal; adjust a second-audio signal depending on a third parameter to generate a third-signal; adjust the second-audio signal depending on a fourth parameter to generate a fourth-signal; mix the first-signal with the third-signal; mix the second-signal with the fourth-signal; in a first mode, control the first parameter depending on a first operation, control the second parameter depending on a second operation, control the third parameter depending on a third operation, and control the fourth parameter depending on a fourth operation; and in a second mode, control the first and second parameters depending on the first operation and control the third and fourth parameters depending on the third operation.

12 Claims, 10 Drawing Sheets

COMPUTER-IMPLEMENTED METHOD FOR CONTROLLING AUDIO PROCESSING APPARATUS AND AUDIO PROCESSING APPARATUS

CROSS REFERENCE TO RELATED APPLICATION

This Application is based on, and claims priority from, Japanese Patent Application No. 2023-114491, filed on Jul. 12, 2023, the entire contents of which are incorporated herein by reference.

BACKGROUND

Technical Field

This disclosure relates to techniques for processing audio signals.

Background Information

There has been proposed in the art an audio processing technique for mixing a plurality of audio signals on each of which signal processing such as volume adjustment processing has already been performed. In the volume adjustment processing, a volume of a sound represented by each of the plurality of audio signals is individually adjusted in accordance with an instruction provided by a user, as disclosed in Japanese Patent Application Laid-Open Publication No. 2016-178391, for example. However, in a configuration in which a volume adjustment parameter for each of the plurality of audio signals is individually adjusted, a disadvantage occurs in that an operation required of a user is complicated. On the other hand, in a configuration in which a parameter for each of the plurality of audio signals is linked to other parameters, a disadvantage occurs in that it is difficult for a user to finely adjust the parameter for each of the plurality of audio signals as per preferences of the user.

SUMMARY

An object of one aspect of this disclosure is to simplify an operation required for control of parameters for audio signals.

In one aspect, a computer-implemented method for controlling an audio processing apparatus includes: adjusting, by at least one processor, a first audio signal in accordance with a first parameter to generate a first signal; adjusting, by the at least one processor, the first audio signal in accordance with a second parameter to generate a second signal; adjusting, by the at least one processor, a second audio signal in accordance with a third parameter to generate a third signal; adjusting, by the at least one processor, the second audio signal in accordance with a fourth parameter to generate a fourth signal; mixing, by the at least one processor, the first signal and the third signal; mixing, by the at least one processor, the second signal and the fourth signal; controlling, in a first operation mode, the first parameter in accordance with a first operation of a first operable element; controlling, in the first operation mode, the second parameter in accordance with a second operation different to the first operation; controlling, in the first operation mode, the third parameter in accordance with a third operation of a second operable element; controlling, in the first operation mode, the fourth parameter in accordance with a fourth operation different to the third operation; controlling, in a second operation mode, the first parameter and the second parameter in accordance with the first operation; and controlling, in the second operation mode, the third parameter and the fourth parameter in accordance with the third operation.

In another aspect, an audio processing apparatus comprises: at least one memory configured to store instructions; and at least one processor configured to execute the instructions to adjust a first audio signal in accordance with a first parameter to generate a first signal; adjust the first audio signal in accordance with a second parameter to generate a second signal; adjust a second audio signal in accordance with a third parameter to generate a third signal; adjust the second audio signal in accordance with a fourth parameter to generate a fourth signal; mix the first signal and the third signal; mix the second signal and the fourth signal; control, in a first operation mode, the first parameter in accordance with a first operation of a first operable element; control, in the first operation mode, the second parameter in accordance with a second operation different to the first operation; control, in the first operation mode, the third parameter in accordance with a third operation of a second operable element; control, in the first operation mode, the fourth parameter in accordance with a fourth operation different to the third operation; control, in a second operation mode, the first parameter and the second parameter in accordance with the first operation; and control, in the second operation mode, the third parameter and the fourth parameter in accordance with the third operation.

DETAILED DESCRIPTION

A: Embodiment

Figure 1:
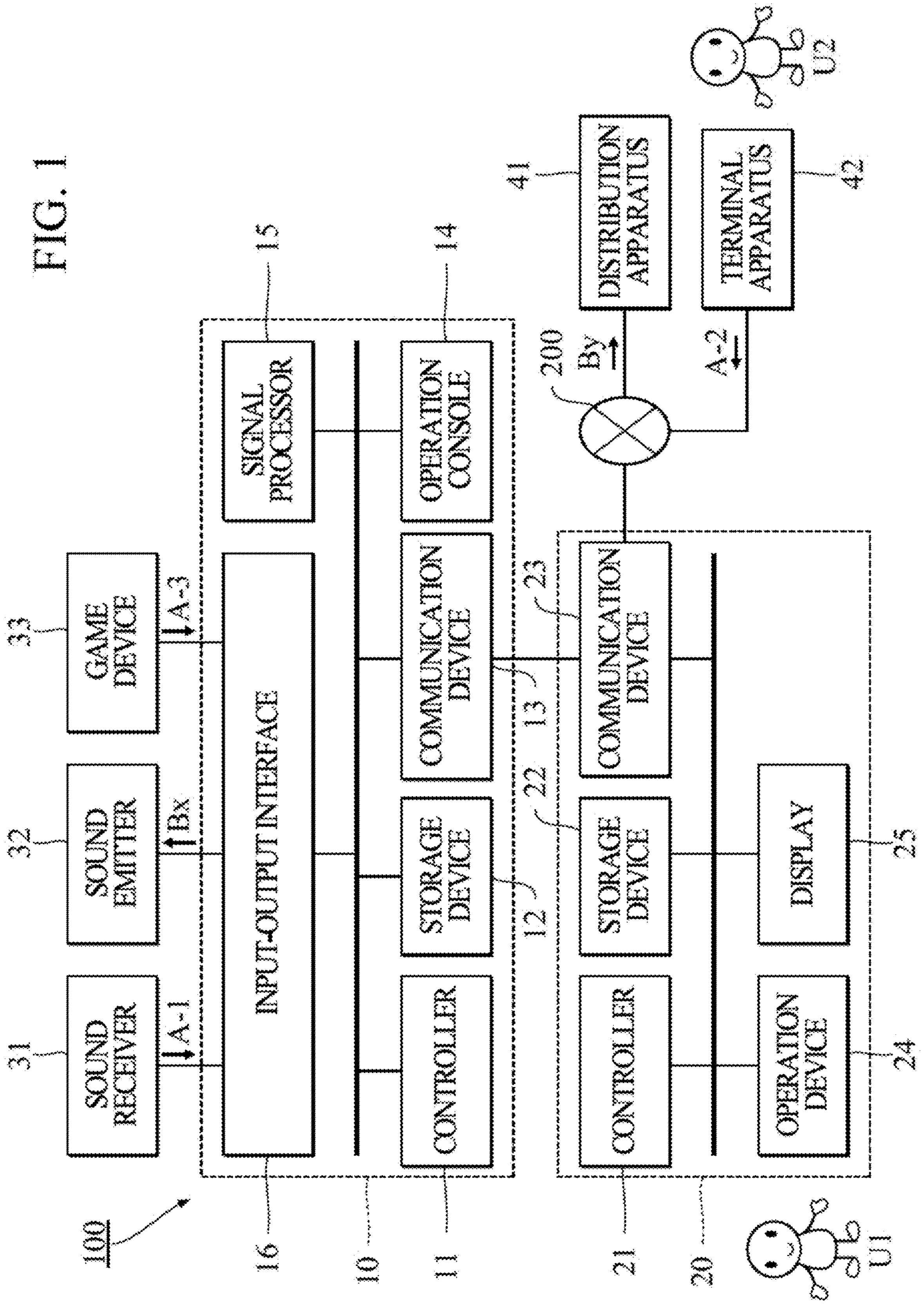
FIG. 1 is a block diagram showing an audio system according to an embodiment.

FIG. 1 is a block diagram showing a configuration of an audio system 100 according to one aspect of this disclosure. In this embodiment, the audio system 100 includes an audio processing apparatus 10 and an information processing apparatus 20. The audio processing apparatus 10 is a digital mixer configured to perform various types of audio processing. The information processing apparatus 20 is a computer system configured to assist the audio processing apparatus 10. Examples of the information processing apparatus 20 include, a smartphone, a tablet terminal, a personal computer, etc. The audio processing apparatus 10 and the information processing apparatus 20 are communicable with each other. Functions of the information processing apparatus 20 may be provided by the audio processing apparatus 10.

The audio processing apparatus 10 is a computer system that includes a controller 11, a storage device 12, a communication device 13, an operation console 14, a signal processor 15, and an input-output interface 16. The audio processing apparatus 10 may be constituted of a single integrated device or may be constituted of a plurality of separate devices.

The controller 11 includes one or more processors configured to control each element of the audio processing apparatus 10. For example, the controller 11 may comprise one or more types of processors such as a central processing unit (CPU), a graphics processing unit (GPU), a sound processing unit (SPU), a digital signal processor (DSP), a field programmable gate array (FPGA), and an application specific integrated circuit (ASIC).

The storage device 12 includes one or more memories configured to store a program (in other words, instructions) for execution by the controller 11, and a variety of types of data for use by the controller 11. The storage device 12 may comprise a known recording medium such as a magnetic recording medium or a semi-conductor recording medium, or may comprise a combination of different types of recording media. Alternatively, the storage device 12 may comprise a portable recording medium that is detachable from the audio processing apparatus 10, or may comprise a remote recording medium (for example, a cloud storage server) that is accessible by the controller 11 via a communication network 200.

The communication device 13 is communicable with the information processing apparatus 20 either by wire or wirelessly. The communication device 13 may be separate from but connectable to the audio processing apparatus 10.

Figure 2:
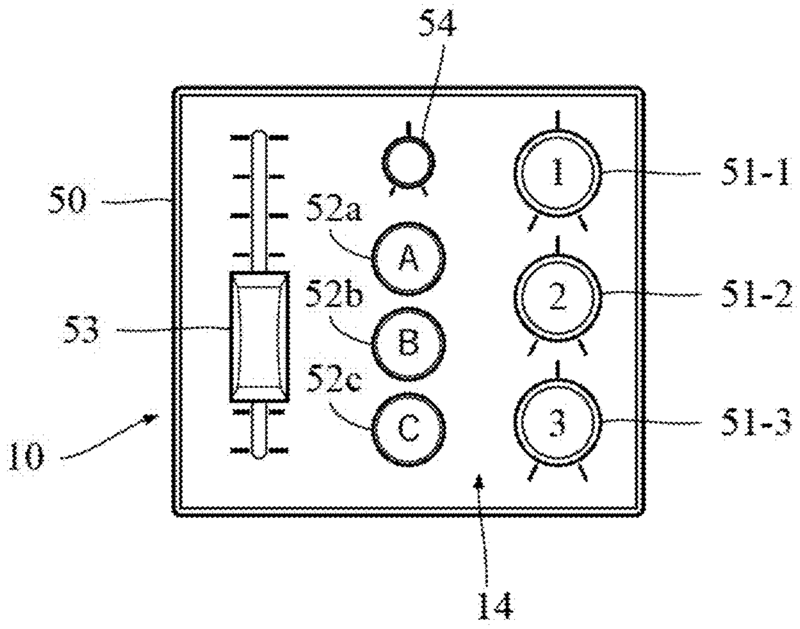
FIG. 2 is a plan view showing an appearance of an audio processing apparatus.

FIG. 2 is a plan view of an appearance of the audio processing apparatus 10. The audio processing apparatus 10 includes a housing 50. The housing 50 accommodates each element of the audio processing apparatus 10. More specifically, the housing 50 accommodates the controller 11, the storage device 12, the communication device 13, the signal processor 15, and the input-output interface 16.

The operation console 14 is an input device configured to receive operations of a user U1 who uses the audio processing apparatus 10. As shown in FIG. 2, the operation console 14 includes three operation knobs 51-1 to 51-3, three operation buttons **52*a* to 52*c*, a fader 53, and an operation knob 54. Each of the three operation knobs 51-1 to 51-3 is a physically operable element and is provided within the housing 50; each of the three operation buttons 52*a* to 52*c* is a physically operable element and is provided within the housing 50; and, each of the fader 53 and the operation knob 54 is a physically operable element and is provided within the housing 50. The operation knob 51-1 is an example of a first operable element, the operation knob 51-2 is an example of a second operable element, and the operation knob 51-3** is an example of a fifth operable element.

Each of the three operation knobs 51-1 to 51-3 is an operation knob **51-*n*, where n=1, 2, or 3. The operation knob 51-*n* is rotatable within a predetermined range in accordance with an operation of the user U1. The operation knob 54 is likewise rotatable. Each of the three operation buttons 52*a* to 52*c* is pressable by the user U1. The fader 53 is movable linearly by the user U1. The operation console 14 may include a touch panel configured to detect a touch of the user U1**.

In FIG. 1, the input-output interface 16 is an interface configured to connect one or more peripheral devices to the audio processing apparatus 10. More specifically, the input-output interface 16 includes different types of connection terminals, which are provided on a side surface of the housing 50, for example. The input-output interface 16 may include connection terminals for wired connections. Examples of the connection terminals for wired connections include a universal serial bus (USB) terminal, a high-definition multimedia interface (HDMI) (registered trademark) terminal, a musical instrument digital interface (MIDI) terminal, a phone connector, etc. The one or more peripheral devices may be wirelessly connected to the audio processing apparatus 10.

In this embodiment, it is assumed that the audio processing apparatus 10 is connected to a sound receiver 31, a sound emitter 32, and a game device 33, which are examples of the one or more peripheral devices. The sound receiver 31 is a microphone configured to receive a voice sound uttered by the user U1 to generate an audio signal A-1. The sound emitter 32 emits a sound in accordance with an audio signal Bx provided by the audio processing apparatus 10. Examples of the sound emitter 32 include a loudspeaker and headphones. In FIG. 1, an analog-to-digital converter configured to convert the audio signal A-1 from analog to digital format, and a digital-to-analog converter configured to convert the audio signal Bx from digital to analog format are omitted for convenience. The game device 33 is an information processing apparatus configured to provide a game to the user U1. The game device 33 provides the audio processing apparatus 10 with an audio signal A-3 representative of a sound in accordance with a progress of the game. The game device 33 is not limited to a game-dedicated information processing apparatus. For example, the game device 33 may be a general-purpose information processing apparatus such as a smartphone, a tablet terminal, and a personal computer.

The signal processor 15 performs audio processing on an audio signal A-n, where A-n=A-1, A-2, or A-3. The audio processing is, for example, signal processing such as mixing, filtering, and equalizing. The signal processor 15 may be implemented by a dedicated DSP. One, some, or all of the functions of the signal processor 15 may be implemented by the controller 11 upon execution of the program (instructions) stored in the storage device 12. The information processing apparatus 20 is a computer system that includes a controller 21, a storage device 22, a communication device 23, an operation device 24, and a display 25. The information processing apparatus 20 may comprise a single integrated device or a plurality of separate devices.

The controller 21 includes one or more processors configured to control each element of the information processing apparatus 20. For example, the controller 21 may comprise one or more types of processors such as a CPU, a GPU, an SPU, a DSP, an FPGA, and an ASIC.

The storage device 22 includes one or more memories configured to store a program (in other words, instructions) for execution by the controller 21 and a variety of types of data for use by the controller 21. The storage device 22 may comprise a known recording medium such as a magnetic recording medium or a semi-conductor recording medium, or may comprise a combination of different types of recording media. Alternatively, the storage device 22 may comprise a portable recording medium that is detachable from the information processing apparatus 20, or may comprise a remote recording medium (for example, a cloud storage server) that is accessible by the controller 21 via the communication network 200.

The communication device 23 is communicable with the audio processing apparatus 10. The communication device 23 may be separate from but connectable to the information processing apparatus 20. The communication device 23 is further communicable with a distribution apparatus 41 and a terminal apparatus 42 via the communication network 200 such as the Internet. For example, the communication device 23 includes a communication unit configured to communicate with the audio processing apparatus 10 and a communication unit configured to communicate with the distribution apparatus 41 and the terminal apparatus 42.

The distribution apparatus 41 is a server system configured to distribute video content that includes an audio signal By generated by the audio processing apparatus 10. The terminal apparatus 42 is an information processing apparatus used by a user U2. The terminal apparatus 42 is, for example, an information processing apparatus such as a smartphone, a tablet terminal, or a personal computer. The user U2 is, for example, a participant in recording video content. For example, the user U1 plays the game while conversing with the user U2. The terminal apparatus 42 transmits the audio signal A-2 representative of a voice sound uttered by the user U2 to the information processing apparatus 20. In the information processing apparatus 20, the communication device 23 receives the audio signal A-2 transmitted by the terminal apparatus 42. The distribution apparatus 41 and the terminal apparatus 42 are each an example of an "information apparatus."

The operation device 24 is an input device configured to receive operations of the user U1. The operation device 24 is, for example, an input device such as a keyboard, a mouse, etc. The display 25 displays images under control of the controller 21. The display 25 is, for example, a liquid crystal display panel or an organic electroluminescence (EL) panel. In a configuration in which the display 25 is provided with a touch panel, the touch panel can serve as the operation device 24. The operation device 24 or the display 25 may be separate from but connectable to the information processing apparatus 20 either by wire or wirelessly.

Figure 3:
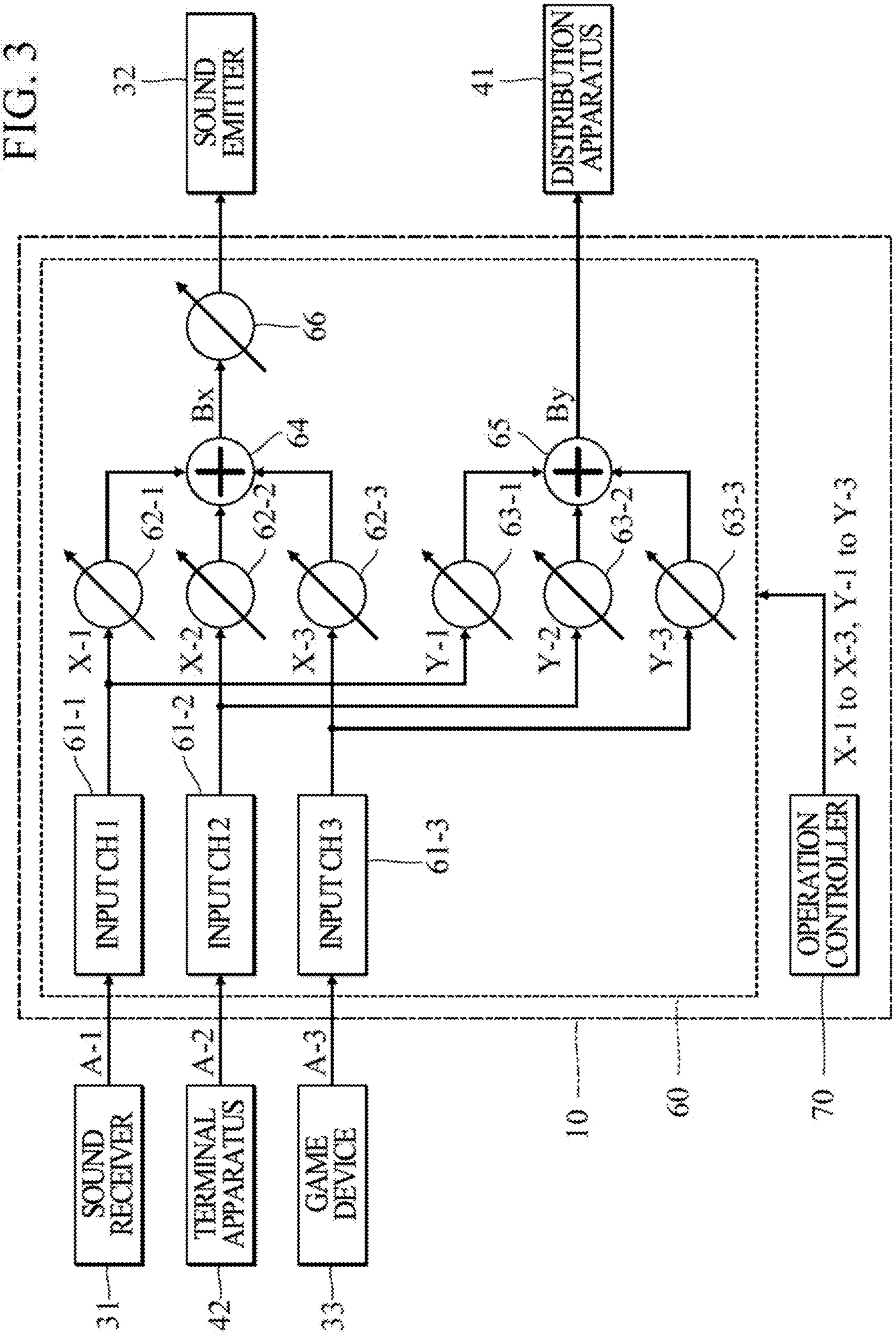
FIG. 3 is a block diagram showing a functional configuration of the audio processing apparatus.

FIG. 3 is a block diagram showing a functional configuration of the audio processing apparatus 10. The audio processing apparatus 10 includes an audio processor 60 and an operation controller 70. For example, the audio processor 60 and the operation controller 70 are implemented by a combination of the controller 11 executing the program and electronic circuitry included in the signal processor 15. Alternatively, the audio processor 60 and the operation controller 70 may be implemented by the controller 11 executing the program. The audio processor 60 and the operation controller 70 are accommodated in the housing 50.

The audio processor 60 performs audio processing on the three audio signals A-1 to A-3 to generate the audio signal Bx and the audio signal By. The audio signal A-1 is representative of a voice sound of the user U1, the audio signal A-2 is representative of a voice sound of the user U2, and the audio signal A-3 is representative of a game sound of the game. The audio signal A-1 is an example of a "first audio signal," the audio signal A-2 is an example of a "second audio signal," and the audio signal A-3 is an example of a "third audio signal."

The audio processor 60 includes three input channels 61-1 to 61-3, three adjusters 62-1 to 62-3, three adjusters 63-1 to 63-3, a first mix bus 64, a second mix bus 65, and an output adjuster 66.

Figure 4:
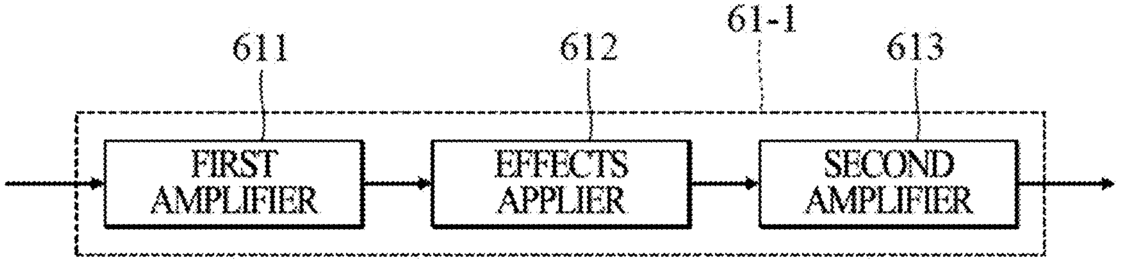
FIG. 4 is a block diagram showing an input channel.

Each of the three input channels 61-1 to 61-3 is an input channel 61-*n*, where n=1, 2, or 3. The input channel 61-*n* performs audio processing on the audio signal A-n. FIG. 4 is a block diagram showing the input channel 61-1 of the audio processor 60. The input channel 61-1 includes a first amplifier 611, an effects applier 612, and a second amplifier 613. The first amplifier 611 amplifies the audio signal A-1 in accordance with an operation of the operation knob 54 by the user U1. The effects applier 612 applies various sound effects to the audio signal A-1 in accordance with operation of the three operation buttons 52*a* to 52*c* by the user U1. For example, the effects applier 612 applies a variety of effects processing such as equalization to adjust a frequency characteristic of the audio signal A-1, reverb to apply reverberation to the audio signal A-1, and voice quality change to change a voice quality represented by the audio signal A-1. The second amplifier 613 adjusts a volume of the sound represented by the audio signal A-1 in accordance with an operation of the fader 53 by the user U1. Alternatively, the second amplifier 613 may adjust the volume of the sound represented by the audio signal A-1 in accordance with an operation of the operation knob 51-1 by the user U1. The second amplifier 613 may be provided in a subsequent stage of the adjuster 62-1 shown in FIG. 3.

The input channel 61-2 performs audio processing on the audio signal A-2, such as effects processing. For example, the input channel 61-2 performs sound image localization to determine a location of a sound image of the vocal sound of the user U2 represented by the audio signal A-2. A parameter for the audio processing performed by the input channel 61-2 is adjusted in accordance with, for example, operations of the operation knobs 51-1 to 51-3.

Similarly, the input channel 61-3 performs audio processing on the audio signal A-3, such as effects processing. For example, the input channel 61-3 performs virtual surround processing to assign to a plurality of virtual sound sources the game sound represented by the audio signal A-3. A parameter for the audio processing performed by the input channel 61-3 is adjusted in accordance with, for example, operations of the operation knobs 51-1 to 51-3. The type of audio processing performed by the input channel 61-*n* is not limited to the foregoing, and other types of audio processing may be implemented as appropriate.

In FIG. 3, each of the three adjusters 62-1 to 62-3 is an adjuster 62-*n*, where n=1, 2, or 3. The adjuster 62-*n* adjusts the audio signal A-n, which is supplied by the input channel 61-*n*, to generate a signal. The generated signal is supplied to the first mix bus 64. In this embodiment, the adjuster 62-*n* adjusts the audio signal A-n in accordance with a send level X-n. When n=1, the send level X-n is a send level X-1; when n=2, the send level X-n is a send level X-2; and, when n=3, the send level X-n is a send level X-3. The send level X-n is a parameter (gain) that specifies a level of the audio signal A-n to be supplied from the input channel 61-*n* to the first mix bus 64. In other words, the adjuster 62-*n* adjusts the volume of the sound represented by the audio signal A-n in accordance with the send level X-n. The send level X-n is stored in the storage device 12 to be set to the adjuster 62-*n* in accordance with an operation of the user U1.

The adjuster 62-1 is an example of a "first adjuster," the adjuster 62-2 is an example of a "third adjuster," and the adjuster 62-3 is an example of a "fifth adjuster." The send level X-1 is an example of a "first parameter," the send level X-2 is an example of a "third parameter," and the send level X-3 is an example of a "fifth parameter."

The first mix bus 64 generates the audio signal Bx by mixing a first signal obtained by the adjuster 62-1 adjusting the audio signal A-1 in accordance with the send level X-1, a third signal obtained by the adjuster 62-2 adjusting the audio signal A-2 in accordance with the send level X-2, and a fifth signal obtained by the adjuster 62-3 adjusting the audio signal A-3 in accordance with the send level X-3. In other words, the audio signal Bx is generated by combining the three signals obtained by adjusting the three audio signals A-1 to A-3. A mix ratio of the three signals in the audio signal Bx is dependent on a relationship between the send levels X-1, X-2, and X-3. The first mix bus 64 is an example of a "first mixer."

The output adjuster 66 adjusts a level of the audio signal Bx generated by the first mix bus 64. The audio signal Bx output from the output adjuster 66 is provided to the sound emitter 32. The sound emitter 32 emits the sound in accordance with the audio signal Bx. The sound is audible to the user U1 of the audio processing apparatus 10. Specifically, the user U1 can listen to a sound in which the voice sound of the user U1 (audio signal A-1), the voice sound of the user U2 (audio signal A-2), and the sound of the game (audio signal A-3) are mixed. The audio signal Bx is an example of a "first output signal."

Each of the three adjusters 63-1 to 63-3 is an adjuster 63-*n*, where n=1, 2, or 3. The adjuster 63-*n* adjusts the audio signal A-n, which is supplied by the input channel 61-*n*, to generate a signal. The generated signal is supplied to the second mix bus 65. In this embodiment, the adjuster 63-*n* adjusts the audio signal A-n in accordance with a send level Y-n. When n=1, the send level Y-n is a send level Y-1; when n=2, the send level Y-n is a send level Y-2, and, when n=3, the send level Y-n is a send level Y-3. The send level Y-n is a parameter (gain) that specifies a level of an audio signal A-n to be supplied from the input channel 61-*n* to the second mix bus 65. In other words, the adjuster 63-*n* adjusts the volume of the sound represented by the audio signal A-n in accordance with the send level Y-n. The send level Y-n is stored in the storage device 12 to be set to the adjuster 63-*n* in accordance with an operation of the user U1.

The adjuster 63-1 is an example of a "second adjuster," the adjuster 63-2 is an example of a "fourth adjuster," and the adjuster 63-3 is an example of a "sixth adjuster." The send level Y-1 is an example of a "second parameter," the send level Y-2 is an example of a "fourth parameter," and the send level Y-3 is an example of a "sixth parameter."

The second mix bus 65 generates the audio signal By mixing a second signal obtained by the adjuster 63-1 adjusting the audio signal A-1 in accordance with the send level Y-1, a fourth signal obtained by the adjuster 63-2 adjusting the audio signal A-2 in accordance with the send level Y-2, and a sixth signal obtained by the adjuster 63-3 adjusting the audio signal A-3 in accordance with the send level Y-3. In other words, the audio signal By is generated by combining the three signals obtained by adjusting the three audio signals A-1 to A-3. A mix ratio of the three signals in the audio signal By is dependent on a relationship between the send levels Y-1, Y-2, and Y-3. As described above, according to this embodiment, it is possible to generate the two audio signals (Bx, By), with the mix ratio of the audio signals A-1, A-2, and A-3 in one of the two audio signals (Bx, By) different to the mix ratio of the audio signals A-1, A-2, and A-3 in the other of the two audio signals (Bx, By). The second mix bus 65 is an example of a "second mixer."

The audio signal By output from the second mix bus 65 is provided to the information processing apparatus 20 shown in FIG. 1. The information processing apparatus 20 generates video content that includes the audio signal By provided by the audio processing apparatus 10. The video includes game images and an image of the user U1, for example. The information processing apparatus 20 transmits the video content to the distribution apparatus 41. In other words, the audio signal By is transmitted to the distribution apparatus 41 via the communication network 200. Viewers (including the user U2) can view the video content distributed by the distribution apparatus 41 and listen to the sound in which the voice sound of the user U1 (audio signal A-1), the voice sound of the user U2 (audio signal A-2), and the game sound (audio signal A-3) are mixed. The audio signal By is an example of a "second output signal." The audio signal By need not be transmitted via the distribution apparatus 41 to the terminal apparatus 42 of each of the viewers, and may be otherwise transmitted to the viewers.

As will be apparent from the above description, the send level X-n is a parameter for the sound to be reproduced for the user U1 (or a parameter for the sound to be monitored by the user U1), and the send level Y-n is a parameter for the sound indicated by the video content to be distributed. As described above, according to this embodiment, it is possible to generate the audio signal Bx representative of the sound that is audible to the user U1 and the audio signal By that is distributed.

Referring to FIG. 3, the operation controller 70 controls operations of the audio processor 60. The operation controller 70 sets, in accordance with an instruction of the user U1, the send level X-n (X-1, X-2, and X-3) and the send level Y-n (Y-1, Y-2, and Y-3) stored in the storage device 12. In this embodiment, there is an individual control mode and a linked control mode, each of which is an operation mode for setting the send level X-n and the send level Y-n. The individual control mode is an example of a "first operation mode," and the linked control mode is an example of a "second operation mode."

Figure 5:
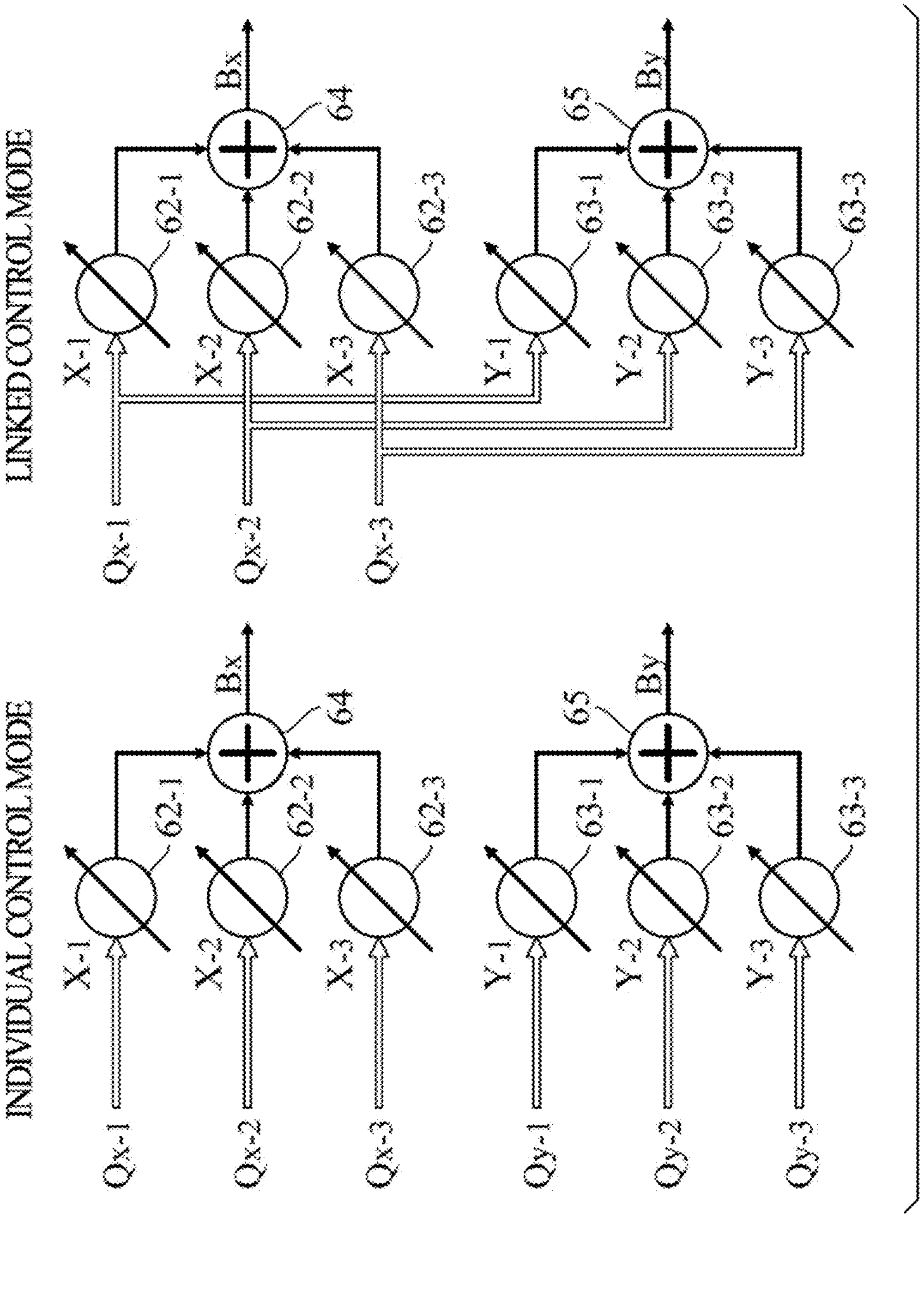
FIG. 5 is an explanatory diagram showing operation modes.

FIG. 5 is an explanatory diagram showing each of the operation modes. The individual control mode is an operation mode in which the send level X-n and the send level Y-n are individually controlled. In other words, the send level X-n is controlled by an operation of the user U1, and the send level Y-n is controlled by another operation of the user U1. Specifically, in the individual control mode, the operation controller 70 sets the send level X-n in accordance with an operation Qx-n of the operation knob 51-*n* of the audio processing apparatus 10 by the user U1. In the individual control mode, the operation controller 70 further sets the send level Y-n in accordance with an operation Qy-n of the operation device 24 of the information processing apparatus 20 by the user U1. When n=1, the operation Qx-n is an operation Qx-1, and the operation Qy-n is an operation Qy-1; when n=2, the operation Qx-n is an operation Qx-2, and the operation Qy-n is an operation Qy-2; and, when n=3, the operation Qx-n is an operation Qx-3, and the operation Qy-n is an operation Qy-3. A process in which in the individual control mode the operation controller 70 sets the send level X-1 in accordance with the operation Qx-1 of the operation knob 51-1 is an example of a first process. A process in which in the individual control mode the operation controller 70 sets the send level Y-1 in accordance with the operation Qy-1 is an example of a second process. A process in which in the individual control mode the operation controller 70 sets the send level X-2 in accordance with the operation Qx-2 of the operation knob 51-2 is an example of a third process. A process in which in the individual control mode the operation controller 70 sets the send level Y-2 in accordance with the operation Qy-2 is an example of a fourth process. In the individual control mode, the operation controller 70 sets the send level X-3 in accordance with the operation Qx-3 of the operation knob 51-3.

In the individual control mode, the operation controller 70 sets the send level Y-3 in accordance with the operation Qy-3. As described above, the operation Qx-n and the operation Qy-n are different from each other.

In contrast to the individual control mode, the linked control mode is an operation mode in which the send level X-n and the send level Y-n are controlled to be linked to each other. Specifically, in the linked control mode, the operation controller 70 sets both the send level X-n and the send level Y-n in accordance with the operation Qx-n of the operation knob 51-*n* of the audio processing apparatus 10 by the user U1. A process in which in the linked control mode the operation controller 70 sets both the send level X-1 and the send level Y-1 to be linked to each other in accordance with the operation Qx-1 is an example of a fifth process. A process in which in the linked control mode the operation controller 70 sets both the send level X-2 and the send level Y-2 to be linked to each other in accordance with the operation Qx-2 is an example of a sixth process. In the linked control mode, the operation controller 70 sets both the send level X-3 and the send level Y-3 to be linked to each other in accordance with the operation Qx-3. Specifically, in the linked control mode, the send level X-n and the send level Y-n are set to a common value in accordance with the operation of the operation knob 51-*n*.

As described above, in the individual control mode, the operation knob 51-*n* is used only for an operation for the send level X-n. In the linked control mode, the operation knob 51-*n* is used for an operation for both the send level X-n and the send level Y-n. However, the operation knob 51-*n* is unable to be used for an operation for only the send level Y-n. For example, in this embodiment, processing to assign the operation knob 51-*n* to an operation for only the send level Y-n and processing to control only the send level Y-n in accordance with an operation of the operation knob 51-*n* are not performed.

The operation Qx-1 is an example of a "first operation"; the operation Qy-1 is an example of a "second operation"; the operation Qx-2 is an example of a "third operation"; the operation Qy-2 is an example of a "fourth operation"; the operation Qx-3 is an example of a "fifth operation"; and, the operation Qy-3 is an example of a "sixth operation.

Figure 6:
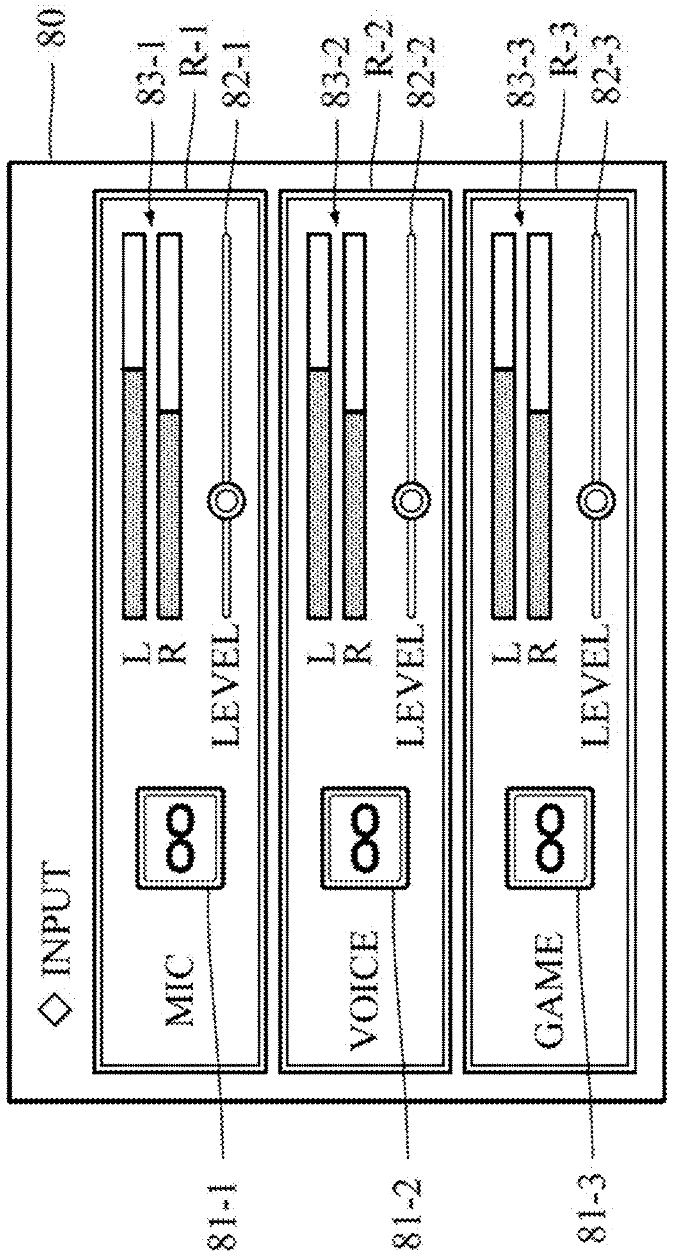
FIG. 6 is a schematic diagram showing a setting image.

FIG. 6 is a schematic diagram showing an image (hereinafter referred to as a "setting image 80") that is displayed on the display 25 for setting the send level Y-n. The setting image 80 includes three regions R-1, R-2, and R-3 that respectively correspond to the send levels Y-1, Y-2, and Y-3. Each of the three regions R-1, R-2, and R-3 is a region R-n, where n=1, 2, or 3.

The region R-n is provided with a selection button 81-*n*, an adjustment bar 82-*n*, and a signal level image 83-*n*. When n=1, the selection button 81-*n* is a selection button 81-1, the adjustment bar 82-*n* is an adjustment bar 82-1, and the signal level image 83-*n* is a signal level image 83-1. When n=2, the selection button 81-*n* is a selection button 81-2, the adjustment bar 82-*n* is an adjustment bar 82-2, and the signal level image 83-*n* is a signal level image 83-2. When n=3, the selection button 81-*n* is a selection button 81-3, the adjustment bar 82-*n* is an adjustment bar 82-3, and the signal level image 83-*n* is a signal level image 83-3. In the region R-n, the selection button 81-*n* and the adjustment bar 82-*n* are each a virtual operable element displayed on the display 25. The selection button 81-*n* is an example of a "selection operable element." The signal level image 83-*n* is an image representative of a level of the signal obtained by the adjuster 63-*n* adjusting the audio signal A-n in accordance with the send level Y-n.

The selection button 81-*n* is a virtual operable element used by the user U1 to select either the linked control mode or the individual control mode. Specifically, each time the user U1 operates the selection button 81-*n*, the operation mode is changed from the linked control mode or from the individual control mode. The controller 21 uses the communication device 23 to notify the audio processing apparatus 10 of a change in operation mode.

As will be apparent from FIG. 6, the selection button 81-*n* is arranged individually for each of the three regions R-1 to R-3. This arrangement enables the user U1 to operate individually the selection button 81-*n* in each of the three regions R-1 to R-3. In other words, the operation mode is set individually for each of the three audio signals A-1 to A-3. For example, an operation mode for a pair of the send level X-1 and the send level Y-1 is set in accordance with an operation of the selection button 81-1; an operation mode for a pair of the send level X-2 and the send level Y-2 is set in accordance with an operation of the selection button 81-2; and, an operation mode for a pair of the send level X-3 and the send level Y-3 is set in accordance with an operation of the selection button 81-3.

In the region R-n, the adjustment bar 82-*n* is a virtual operable element used by the user U1 to adjust the send level Y-n in the individual control mode. The user U1 can set the send level Y-n to a desired value by operating the adjustment bar 82-*n* using the operation device 24. In FIG. 5, the operation Qy-n is an operation of the adjustment bar 82-*n* in the region R-n by the user U1. The controller 21 uses the communication device 23 to notify the audio processing apparatus 10 of a setting value of the send level Y-n indicated by the user U1.

Figure 7:
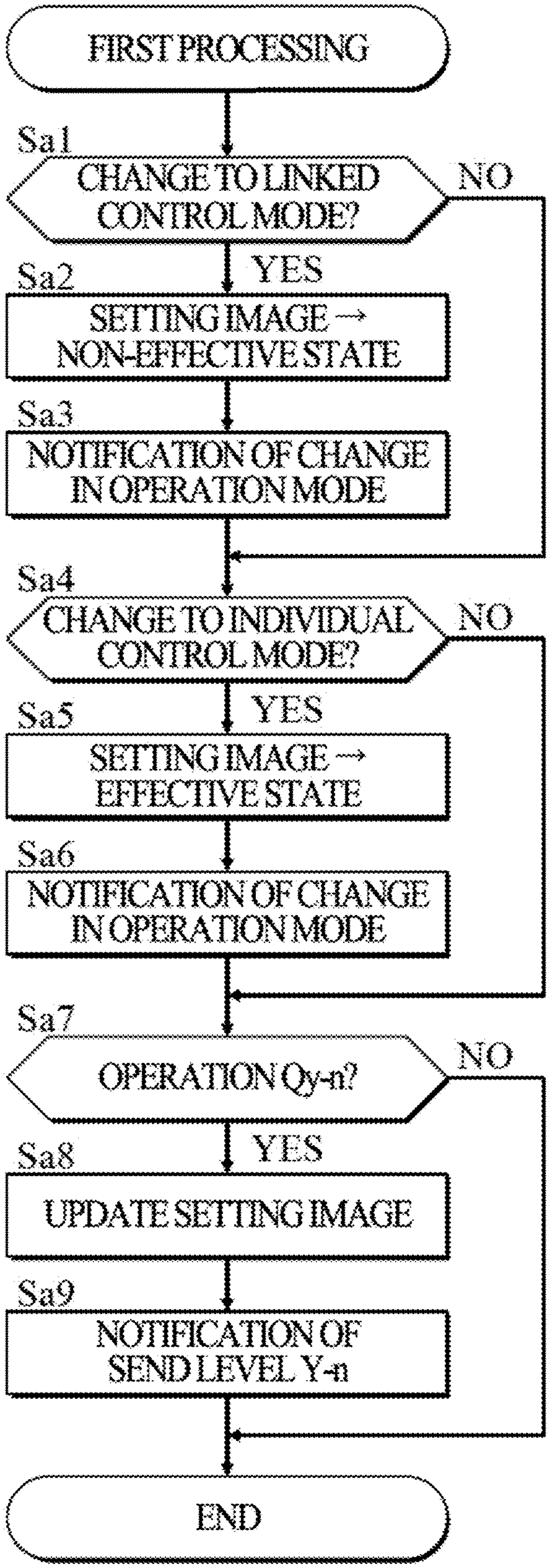
FIG. 7 is a flowchart showing a first processing procedure.

FIG. 7 is a flowchart showing processing (hereinafter referred to as first processing) performed by the controller 21 of the information processing apparatus 20 to switch the operation mode. The first processing is performed for each of the audio signals A-1 to A-3. The first processing for the audio signal A-1, the first processing for the audio signal A-2, and the first processing for the audio signal A-3 are performed in series or in parallel and are repeated in a predetermined cycle.

When the first processing starts, the controller 21 determines whether a change from the individual control mode to the linked control mode is indicated by an operation of the selection button 81-*n* by the user U1 (Sa1).

When the change to the linked control mode is indicated (Sa1: YES), the controller 21 sets the adjustment bar 82-*n* to a non-effective state (Sa2). The non-effective state is a state in which the operation Qy-n of the adjustment bar 82-*n* by the user U1 cannot be performed. In the non-effective state, the adjustment bar 82-*n* is grayed out, for example. The controller 21 uses the communication device 23 to notify the audio processing apparatus 10 of the change from the individual control mode to the linked control mode (Sa3). On the other hand, when the change to the linked control mode is not indicated (Sa1: NO), neither the state of control of the adjustment bar 82-*n* (Sa2) nor the notification of the change in operation mode (Sa3) is performed.

The controller 21 determines whether a change from the linked control mode to the individual control mode is indicated by an operation of the selection button 81-*n* by the user U1 (Sa4).

When the change to the individual control mode is indicated (Sa4: YES), the controller 21 sets the adjustment bar 82-*n* to an effective state (Sa5). The effective state is a state in which the operation Qy-n of the adjustment bar 82-*n* by the user U1 can be performed. The controller 21 uses the communication device 23 to notify the audio processing apparatus 10 of the change from the linked control mode to the individual control mode (Sa6). On the other hand, when the change to the individual control mode is not indicated (Sa4: NO), neither the state of control of the adjustment bar 82-*n* (Sa5) nor the notification of the change in operation mode (Sa6) is performed.

In the individual control mode, the operation Qy-n of the adjustment bar 82-*n* can be performed by the user U1 in the effective state to provide an instruction to change the send level Y-n. The controller 21 determines whether the operation Qy-n is performed by the user U1 (Sa7). When the operation Qy-n is performed by the user U1 (Sa7: YES), the controller 21 updates display of the adjustment bar 82-*n* in accordance with the operation Qy-n (Sa8). The controller 21 notifies the audio processing apparatus 10 of the operation Qy-n performed by the user U1 (Sa9). Specifically, the controller 21 transmits a value of the send level Y-n, which is changed in accordance with the operation Qy-n, from the communication device 23 to the audio processing apparatus 10. The specific first processing procedure is described above.

Figure 8:
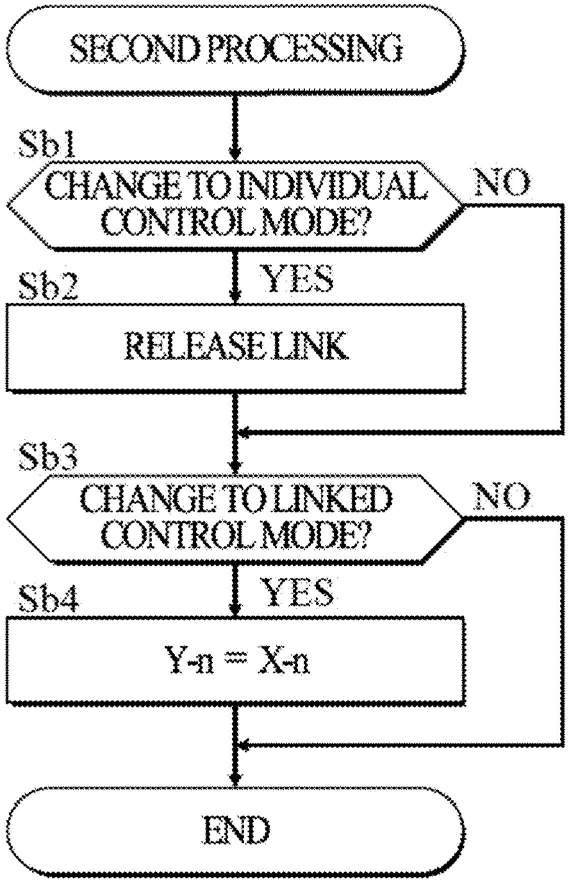
FIG. 8 is a flowchart showing a second processing procedure.

FIG. 8 is a flowchart showing processing (hereinafter referred to as second processing) that is performed by the controller 11 (operation controller 70) of the audio processing apparatus 10 to switch the operation mode. The second processing is performed for each of the audio signals A-1 to A-3. The second processing for the audio signal A-1, the second processing for the audio signal A-2, and the second processing for the audio signal A-3 are performed in series or in parallel and are repeated in a predetermined cycle.

When the second processing starts, the controller 11 determines whether the controller 11 is notified of the change from the linked control mode to the individual control mode by the information processing apparatus 20 (Sb1). In other words, the controller 11 determines whether the user U1 provides an instruction to change the linked control mode to the individual control mode.

When the controller 11 is notified of the change to the individual control mode (Sb1: YES), the controller 11 releases a link between the send level X-n and the send level Y-n (Sb2). The value of the send level X-n stored in the storage device 12 is maintained at a value of the send level X-n at a point in time immediately before the linked control mode is changed to the individual control mode. The value of the send level Y-n stored in the storage device 12 is maintained at a value of the send level Y-n at a point in time immediately before the linked control mode is changed to the individual control mode. On the other hand, when the controller 11 is not notified of the change to the individual control mode (Sb1: No), the link between the send level X-n and the send level Y-n is not released.

The controller 11 determines whether the controller 11 is notified of the change from the individual control mode to the linked control mode by the information processing apparatus 20 (Sb3). In other words, the controller 11 determines whether the user U1 provides an instruction to change the individual control mode to the linked control mode.

When the controller 11 is notified of the change to the linked control mode (Sb3: YES), the controller 11 sets a value of the send level Y-n to a value of the send level X-n at a point in time immediately before the individual control mode is changed to the linked control mode (Sb4). In other words, the value of the send level Y-n is changed to a value equal to the value of the send level X-n. On the other hand, when the controller 11 is not notified of the change to the linked control mode (Sb3: NO), the control of the send level Y-n (Sb4) is not performed. The specific second processing procedure is described above.

Figure 9:
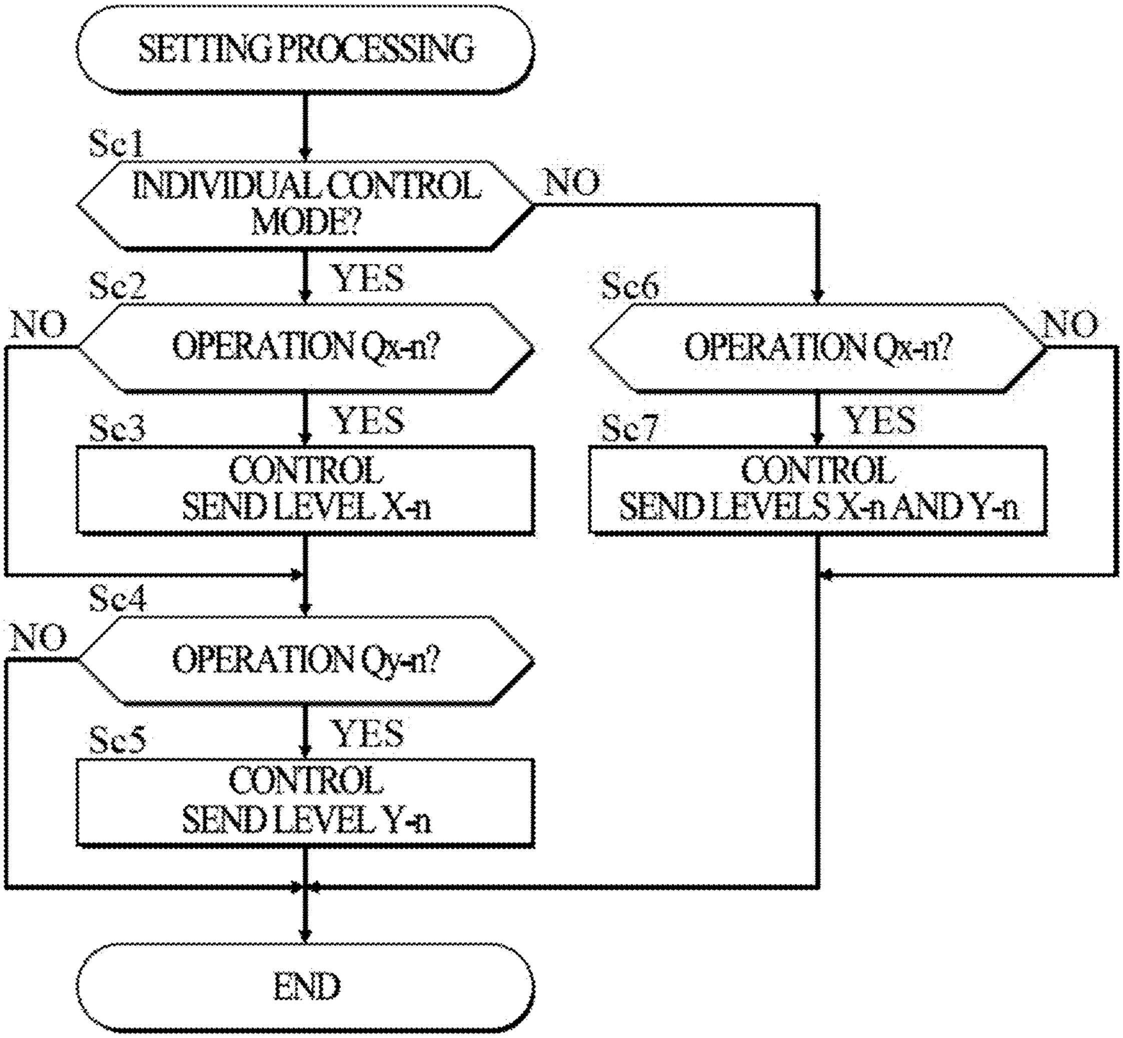
FIG. 9 is a flowchart showing a setting processing procedure.

FIG. 9 is a flowchart showing processing (hereinafter referred to as "setting processing") that is performed by the controller 11 (operation controller 70) to set the send level X-n and the send level Y-n. The setting processing is performed for each of the audio signals A-1 to A-3. The setting processing for the audio signal A-1, the setting processing for the audio signal A-2, and the setting processing for the audio signal A-3 are performed in series or in parallel and are repeated in a predetermined cycle.

When the setting processing starts, the controller 11 determines whether a current operation mode is the individual control mode (Sc1). When the current operation mode is the individual control mode (Sc1: YES), the controller 11 determines whether the controller 11 receives an operation Qx-n of the operation knob 51-*n* (Sc2). When the controller 11 receives the operation Qx-n (Sc2: YES), the controller 11 controls the send level X-n in accordance with the operation Qx-n (Sc3). Specifically, the value of the send level X-n stored in the storage device 12 is changed in accordance with the operation Qx-n. On the other hand, when the operation Qx-n is not received (Sc2: NO), the controller 11 does not perform the control (Sc3) of the send level X-n.

In the individual control mode, the controller 11 determines whether the controller 11 is notified of the operation Qy-n performed by the user U1 by the information processing apparatus 20 (Sc4). In other words, the controller 11 determines whether the operation Qy-n is performed by the user U1.

When the controller 11 is notified of the operation Qy-n (Sc4: YES), the controller 11 controls the send level Y-n in accordance with the operation Qy-n (Sc5). Specifically, the controller 11 changes the value of the send level Y-n stored in the storage device 12 to the value provided by the information processing apparatus 20. On the other hand, when the controller 11 is not notified of the operation Qy-n (Sc4: NO), the controller 11 does not perform the control (Sc5) of the send level Y-n. As described above, in the individual control mode, the control (Sc3) of the send level X-n in accordance with the operation Qx-n and the control (Sc5) of the send level Y-n in accordance with the operation Qy-n are performed individually.

On the other hand, when the current operation mode is the linked control mode (Sc1: NO), the controller 11 determines whether the controller 11 receives the operation Qx-n of the operation knob 51-*n* (Sc6). When the controller 11 receives the operation Qx-n (Sc6: YES), the controller 11 controls the send level X-n and the send level Y-n to be linked to each other in accordance with the operation Qx-n (Sc7). Specifically, the value of the send level X-n and the value of the send level Y-n are changed to a common value. On the other hand, when the controller 11 does not receive the operation Qx-n (Sc6: NO), the controller 11 does not perform the control (Sc7) of the send level X-n and the send level Y-n.

As described above, in this embodiment, in the individual control mode, the send level X-n and the send level Y-n are controlled individually. Thus, it is possible to finely adjust the send level X-n and the send level Y-n individually as per the requirements (preferences) of the user U1. On the other hand, in the linked control mode, the send level X-n and the send level Y-n are controlled in accordance with the operation Qx-n of the operation knob 51-*n*. In other words, the operation Qx-n is used both for the control of the send level X-n and for the control of the send level Y-n. Thus, in the linked control mode, the operation Qy-n is not required to adjust the send level Y-n. According to this embodiment, compared to a configuration in which only individual control of the send level X-n and the send level Y-n is available, it is possible to simplify operations to control the send level X-n and the send level Y-n. In other words, it is possible to simplify operations to adjust the mix ratio at each of the first mix bus 64 and the second mix bus 65. In this embodiment, in particular, the send level X-n and the send level Y-n are controlled to be linked to each other in the linked control mode. Thus, both the send level X-n and the send level Y-n can be readily changed as per the requirements of the user U1.

In this embodiment, the send level Y-n at a point in time immediately before the change from the linked control mode to the individual control mode is maintained even at a point in time immediately after the change to the individual control mode. Thus, the send level X-n and the send level Y-n, which are set to be linked to each other in the linked control mode, are used as start points, and the send level X-n and the send level Y-n are controlled individually after the change to the individual control mode. In other words, after the send level Y-n is set to a target value in the linked control mode in which the send level X-n and the send level Y-n are linked to each other, the send level X-n is finely adjusted in the individual control mode by a difference between the target value of the send level Y-n and a target value of the send level X-n. Thus, it is possible to set the send level X-n and the send level Y-n to the target values quickly and easily.

In the adjustment process described above, the user U1 can listen to sound emitted by the sound emitter 32 and check at any time both an adjustment state of the send level Y-n (and send level X-n) in the linked control mode and an adjustment state of the send level X-n in the individual control mode. In other words, by listening to the sound emitted by the sound emitter 32, the user U1 can adjust both the send level X-n and the send level Y-n.

In this embodiment, when the individual control mode is changed to the linked control mode, the value of the send level Y-n is set to a value of the send level X-n at a point in time immediately before the individual control mode is changed to the linked control mode. In other words, when a value of the send level X-n set in the individual control mode is used as an initial value of the send level Y-n, the send level Y-n can be adjusted in the linked control mode. Thus, compared to a configuration in which the send level Y-n is not changed in response to the change to the linked control mode, it is possible to simplify operations required to set both the send level X-n and the send level Y-n to the target values.

In this embodiment, the operation mode (individual control mode, linked control mode) is set for each set of the send level X-n and the send level Y-n. Thus, compared to a configuration in which the operation modes are jointly set for the three audio signals A-1 to A-3, each send level X-n and each send level Y-n can be set variously by use of convenient operations.

In the linked control mode, the send level X-n and the send level Y-n are controlled in accordance with the operation Qx-n of the operation knob 51-*n*. Thus, a physical operable element dedicated to adjustment of the send level Y-n (operation Qy-n) is not required for the audio processing apparatus 10. Accordingly, compared to a configuration in which a physical operable element for the operation Qy-n in addition to the operation knob 51-*n* for the operation Qx-n is provided within the audio processing apparatus 10, it is possible to reduce a size of the housing 50 of the audio processing apparatus 10. Furthermore, the selection buttons 81 for selection of the operation mode are each a virtual operable element displayed on the display 25. Thus, compared to a configuration in which the physical operable element for selection of the operation mode is provided within the housing 50, it is possible to reduce the size of the housing 50 of the audio processing apparatus 10.

B: Modifications

The following are examples of modifications of the embodiment described above. Two or more modifications freely selected from the following modifications may be combined as long as no conflict arises from such combination.

(1) In the above embodiment, the send level X-n and the send level Y-n are set to a common value in the linked control mode. However, the send level X-n and the send level Y-n need not necessarily be set to a common value in the linked control mode. In other words, the “link” between the send level X-n and the send level Y-n is not limited to the example in the embodiment described above. For example, the “link” includes a state in which the send level X-n and the send level Y-n are linked to each other while maintaining a predetermined difference between the send level X-n and the send level Y-n. The “link” described above means a state in which one of the send level X-n and the send level Y-n is controlled in accordance with a change in the other.

The “link” may include a configuration in which an aspect of a change in the send level X-n differs from an aspect of a change in the send level Y-n. The aspect of the change is, for example, a change condition such as a direction of change (increase, decrease, maintain), a rate of change, and an amount of change. As will be understood from the above description, the “link” between the send level X-n and the send level Y-n is comprehensively described as a state in which the send level X-n and the send level Y-n are changed in accordance with a common operation Qx-n.

(2) In the above embodiment, there is described control of the send levels (X-n, Y-n) for the audio signal A-n. However, parameters controlled for the audio signal A-n are not limited to the send levels (X-n, Y-n). For example, the operation controller 70 may control parameters for audio processing performed on the audio signal A-n. Control here applies to various parameters for the audio processing such as equalizing, filtering, reverb, and voice quality change.

(3) In the above embodiment, a configuration is described in which the send level X-n (furthermore the send level Y-n in the linked control mode) is controlled in accordance with the operation Qx-n of the operation knob 51-*n*. However, a form of the physical operable element for receiving an operation for controlling the send level X-n can be freely selected and is not limited the operation knob 51-*n*. For example, a button-type physical operable element or a fader-type physical operable element may be used for receiving an operation for controlling the send level X-n. The operable element for receiving the operation Qx-n for controlling the send level X-n is not limited to the physical operable elements described above. For example, the send level X-n may be controlled in accordance with an operation of a touch panel provided within a display.

(4) In the above embodiment, the selection button 81-*n* is described as a virtual operable element displayed on the display 25. However, the selection button 81-*n* may be a physical operable element provided within the housing 50 of the audio processing apparatus 10.

(5) In the above embodiment, a configuration is described in which the audio signal A-1 represents the voice sound of the user U1, the audio signal A-2 represents the voice sound of the user U2, and the audio signal A-3 represents the sound of the game. However, a type of sound represented by the audio signal A-n is not limited thereto. For example, the audio signal A-1 may be a signal representative of the voice sound of the user U2 or a signal representative of the sound of the game. The audio signal A-2 may be a signal representative of the voice sound of the user U1 or a signal representative of the sound of the game, for example. The audio signal A-3 may be a signal representative of the voice sound of the user U1 or a signal representative of the voice sound of the user U2, for example. The audio signal A-n may also represent another type of sound.

In the above embodiment, a configuration is described in which the audio signal A-3 is provided by the game device 33 to the audio processing apparatus 10 via the input-output interface 16. However, a source of the audio signal A-3 and a path through which the audio signal A-3 is provided are not limited thereto. For example, in a configuration in which the information processing apparatus 20 provides the game to the user U1, the audio signal A-3 representative of the sound of the game may be provided by the information processing apparatus 20 to the audio processing apparatus 10. For example, the audio signal A-3 transmitted from the communication device 23 of the information processing apparatus 20 is received by the communication device 13 of the audio processing apparatus 10.

(6) In the above embodiment, a configuration is described in which the audio signal Bx represents the sound audible to the user U1 and the audio signal By represents the sound that is distributed. However, use of the audio signal Bx and use of the audio signal By are not limited thereto. For example, a configuration can be assumed in which the audio signal Bx represents the sound for distribution and the audio signal By represents the sound audible to the user U1. One or both of the audio signal Bx and the audio signal By may be recorded in a recording medium such as the storage device 12.

Figure 10:
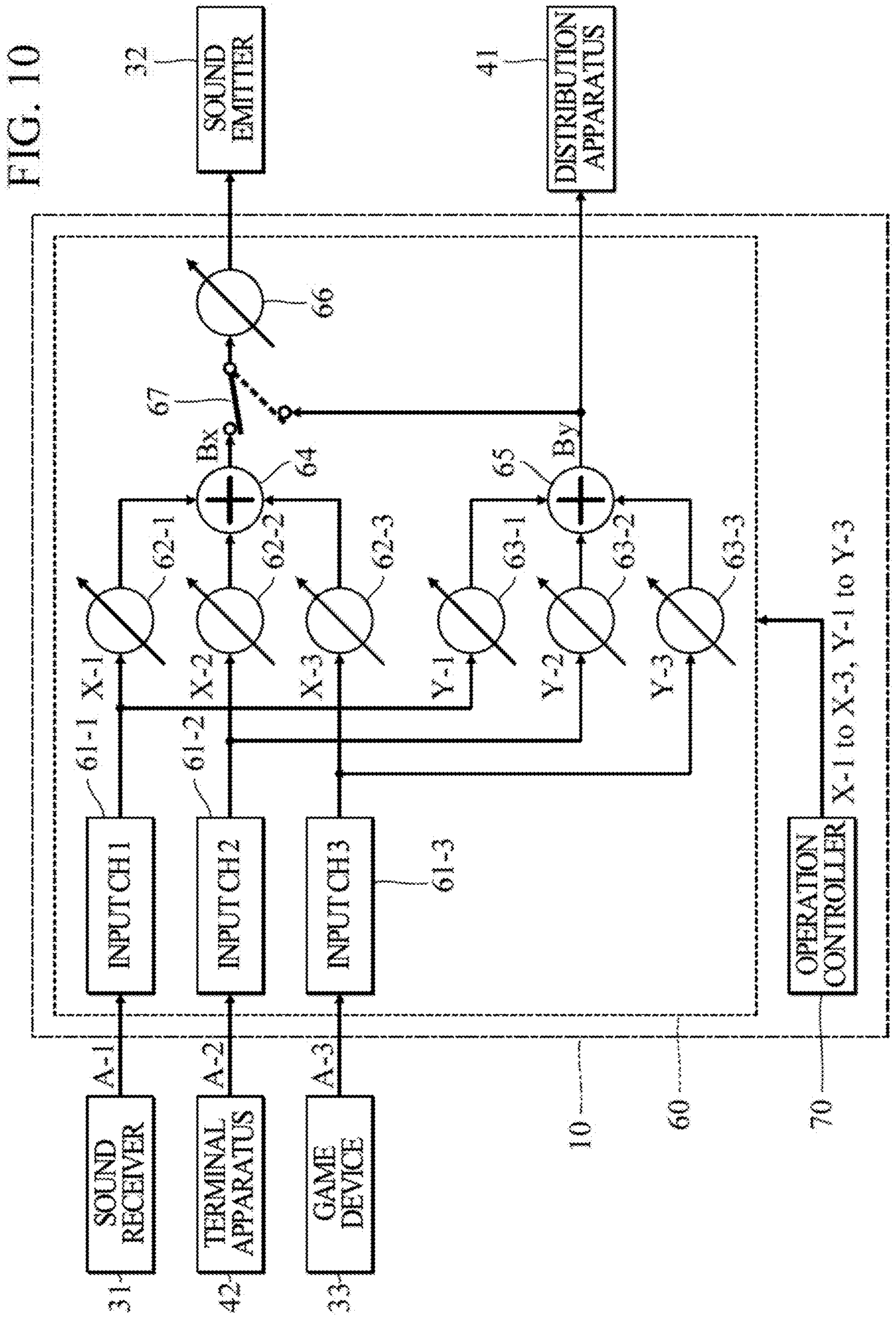
FIG. 10 is a block diagram showing a functional configuration of an audio processing apparatus according to a modification.

As shown in FIG. 10, the audio processing apparatus 10 can be provided with a switch 67. The switch 67 switches a signal that is to be provided to the sound emitter 32 (output adjuster 66) from the audio signal Bx or from the audio signal By. For example, the switch 67 selects the signal that is to be provided to the sound emitter 32 from among the audio signal Bx and the audio signal By in accordance with an operation of the operation console 14 by the user U1, or an operation of the operation device 24 by the user U1. According to the configuration described above, the user U1 can confirm the audio signal By for distribution by way of sound emitted by the sound emitter 32.

(7) In the above embodiment, a configuration is described in which the operation mode (individual control mode, linked control mode) is set for each pair of the send level X-n and the send level Y-n. However, an operation mode for the audio signal A-1, an operation mode for the audio signal A-2, and an operation mode for the audio signal A-3 may be jointly set.

The linked control mode may be set for only one or two of the three audio signals A-1 to A-3. For example, for each of the two audio signals A-n among the three audio signals A-1 to A-3, the operation controller 70 links the send level X-n and send level Y-n to each other in accordance with an operation of the user U1. For the other audio signal A-n among the three audio signals A-1 to A-3, the operation controller 70 controls the send level X-n and send level Y-n individually.

(8) In the above embodiment, a configuration is described in which, at a point in time at which the individual control mode is changed to the linked control mode, the value of the send level Y-n is set to the current value of the send level X-n at a point in time immediately before the individual control mode is changed to the linked control mode. However, a point in time at which the value of the send level Y-n is set to the value of the send level X-n is not limited to the point in time at which the individual control mode is changed to the linked control mode. For example, at a point in time freely selected within a period in the linked control mode, or at a point in time at which an instruction to change to the individual control mode is provided, the value of the send level Y-n may be set to a value of the send level X-n.

(9) In the above embodiment, two types of operation modes, the individual control mode and the linked control mode are described. However, another operation mode may be included. For example, a plurality of operation modes may include an operation mode for prohibiting change in each of the send level X-n and the send level Y-n, in addition to the individual control mode and the linked control mode. As will be understood from the above description, the operation controller 70 selects an operation mode from the plurality of operation modes including the individual control mode and the linked control mode.

(10) The functions of the audio processing apparatus 10 may be implemented by one or more processors such as the controller 11 working in coordination with the program stored in the storage device 12. The program according to this disclosure may be provided in a form readable by a computer and stored in a recording medium, and installed in the computer. The recording medium is, for example, a non-transitory recording medium. While an optical recording medium (an optical disk) such as a compact disk read-only memory (CD-ROM) is one example of the recording medium, the recording medium may also include a recording medium of any known form, such as a semiconductor recording medium and a magnetic recording medium. The non-transitory recording medium includes any recording medium except for a transitory, propagating signal and does not exclude a volatile recording medium. The non-transitory recording medium may be a storage apparatus in the distribution apparatus 41 that stores a computer program (in other words, instructions) for distribution via the communication network 200.

(11) The denotations "first," "second," "third," and "m-th" (m is a natural number) are used in this disclosure for convenience and as mere formal labels for distinguishing different elements from each other, and such denotations have no substantial inherent meaning. Thus, denotation of positions of elements or an order of elements as "first," "second," "third," and "n-th" is not limited to a narrow literal interpretation, and positions and order of elements and the like are broadly interpreted.

C: Supplemental Notes

The following configurations, for example, are derivable from the embodiments or the modifications described above.

A method for controlling an audio processing apparatus according to one aspect (first aspect) of this disclosure is a computer-implemented method for controlling an audio processing apparatus, and the method includes: adjusting, by at least one processor, a first audio signal in accordance with a first parameter to generate a first signal; adjusting, by the at least one processor, the first audio signal in accordance with a second parameter to generate a second signal; adjusting, by the at least one processor, a second audio signal in accordance with a third parameter to generate a third signal; adjusting, by the at least one processor, the second audio signal in accordance with a fourth parameter to generate a fourth signal; mixing, by the at least one processor, the first signal and the third signal; mixing, by the at least one processor, the second signal and the fourth signal; controlling, in a first operation mode, the first parameter in accordance with a first operation of a first operable element; controlling, in the first operation mode, the second parameter in accordance with a second operation different to the first operation; controlling, in the first operation mode, the third parameter in accordance with a third operation of a second operable element; controlling, in the first operation mode, the fourth parameter in accordance with a fourth operation different to the third operation; controlling, in a second operation mode, the first parameter and the second parameter in accordance with the first operation; and controlling, in the second operation mode, the third parameter and the fourth parameter in accordance with the third operation. In other words, a method for controlling an audio processing apparatus according to one aspect of this disclosure is a computer-implemented method for controlling an audio processing apparatus, and the method includes: a first process; a second process; a third process; a fourth process; a fifth process; and a sixth process, wherein the audio processing apparatus includes: at least one memory configured to store instructions; and at least one processor configured to execute the instructions to function as: a first adjuster configured to adjust a first audio signal in accordance with a first parameter to generate a first signal; a second adjuster configured to adjust the first audio signal in accordance with a second parameter to generate a second signal; a third adjuster configured to adjust a second audio signal in accordance with a third parameter to generate a third signal; a fourth adjuster configured to adjust the second audio signal in accordance with a fourth parameter to generate a fourth signal; a first mixer configured to mix the first signal and the third signal; and a second mixer configured mix the second signal and the fourth signal, wherein the first process includes controlling, in a first operation mode, the first parameter in accordance with a first operation of a first operable element, the second process includes controlling, in the first operation mode, the second parameter in accordance with a second operation different to the first operation, the third process includes controlling, in the first operation mode, the third parameter in accordance with a third operation of a second operable element, the fourth process includes controlling, in the first operation mode, the fourth parameter in accordance with a fourth operation different to the third operation, the fifth process includes controlling, in a second operation mode, the first parameter and the second parameter in accordance with the first operation, and the sixth process includes controlling, in the second operation mode, the third parameter and the fourth parameter in accordance with the third operation.

According to this aspect, in the first operation mode, the first parameter and the second parameter are individually controlled. Thus, it is possible to finely adjust each of the first parameter and the second parameter. On the other hand, in the second operation mode, the first parameter and the second parameter are controlled in accordance with the first operation of the first operable element. In other words, the first operation is used to control both the first parameter and the second parameter. Thus, in the second operation mode, the second operation is not required for adjustment of the second parameter. According to this aspect, compared to a configuration in which only separate control of the first parameter and the second parameter is available, it is possible to simplify control of the first parameter and the second parameter. Similarly, it is possible to simplify control of the third parameter and the fourth parameter. As described above, in the second operation mode, the first parameter and the second parameter are controlled in accordance with the first operation, and the third parameter and the fourth parameter are controlled in accordance with the third operation. Thus, it is possible to simplify operations required to adjust a mix ratio at each of the first mixer and the second mixer.

An "m-th parameter" (m=1, 2, 3, or 4) is a parameter applied to an m-th adjuster configured to adjust an m-th audio signal. The "m-th parameter" is, for example, a send level for the m-th audio signal.

The first operation is an operation of the first operable element. On the other hand, the second operation is an operation different to the first operation. The second operation is, for example, an operation of an operable element that is separate from the first operable element. The operable element for the second operation may be an operable element provided within the audio processing apparatus, or may be an operable element provided within a peripheral device connected to the audio processing apparatus. The operable element for the second operation may be a physical operable element or may be a virtual operable element. Although the above description focuses on the second operation, the description of the second operation can be applied to the fourth operation.

In the specific example (second aspect) of the first aspect, the controlling, in the second operation mode, the first parameter and the second parameter in accordance with the first operation includes controlling, in the second operation mode, the first parameter and the second parameter to be linked to each other in accordance with the first operation, and the controlling, in the second operation mode, the third parameter and the fourth parameter in accordance with the third operation includes controlling, in the second operation mode, the third parameter and the fourth parameter to be linked to each other in accordance with the third operation. According to this aspect, the first parameter and the second parameter are linked to each other. Thus, both the first parameter and the second parameter can be readily changed as per requirements of a user. In addition, the third parameter and the fourth parameter are linked to each other. Thus, both the third parameter and the fourth parameter can be readily changed as per requirements of the user.

In the specific example (third aspect) of the second aspect, the method includes, in response to the second operation mode being changed to the first operation mode: releasing a state in which the first parameter and the second parameter are linked to each other, while maintaining a value of the second parameter at a point in time immediately before the second operation mode is changed to the first operation mode; and releasing a state in which the third parameter and the fourth parameter are linked to each other while maintaining a value of the fourth parameter at the point in time immediately before the second operation mode is changed to the first operation mode. According to this aspect, the second parameter, which is at a point in time immediately before a change from the second operation mode to the first operation mode, is maintained at a point in time immediately after the change to the first operation mode. Thus, the first parameter and the second parameter, which in the second operation are set to be linked to each other, are used as starting points, and the first parameter and the second parameter are controlled individually after the change to the first operation mode. In other words, after the second parameter is set to a target value (a target value of a send level for the second mixer) in the second operation mode in which the first parameter and the second parameter are linked to each other, the first parameter is finely adjusted in the first operation mode by a difference between the target value of the second parameter and a target value of the first parameter (a target value of a send level for the first mixer). Thus, target values of the first parameter and the second parameter can be set quickly and easily. The above description of the first parameter and the second parameter can be applied to the third parameter and the fourth parameter.

In the specific example (fourth aspect) of the second aspect or the third aspect, the method further includes, in response to first operation mode being changed to the second operation mode: setting a value of the second parameter to a value of the first parameter at a point in time immediately before the first operation mode is changed to the second operation mode; and setting a value of the fourth parameter to a value of the third parameter at the point in time immediately before the first operation mode is changed to the second operation mode. According to this aspect, in a state in which a value of the first parameter set in the first operation mode is used as an initial value of the second parameter, the second parameter can be adjusted in the second operation mode. Thus, it is possible to simplify operations required to set the target values of both the first parameter and the second parameter.

In a specific example (fifth aspect) of any of the first to fourth aspects, the method includes selecting individually, for each of a pair of the first parameter and the second parameter and a pair of the third parameter and the fourth parameter, an operation mode from among a plurality of operation modes including the first operation mode and the second operation mode. According to this aspect, an operation mode (the first operation mode or the second operation mode) is individually set for each of a pair of the first parameter and the second parameter and a pair of the third parameter and the fourth parameter. Thus, compared to a configuration in which the operation modes are jointly set for the first parameter to the fourth parameter, each of the first parameter to the fourth parameter can be variously set using convenient operations.

The term "setting an operation mode individually" means setting an operation mode separately for each of the pair of the first parameter and the second parameter and the pair of the third parameter and the fourth parameter. Thus, for example, the first operation mode is selected for one of the pair of the first parameter and the second parameter and the pair of the third parameter and the fourth parameter, and the second operation mode is selected for other parameters.

In a specific example (sixth aspect) of any of the first to fifth aspects, the method includes adjusting, by the at least one processor, a third audio signal in accordance with a fifth parameter to generate a fifth signal; adjusting, by the at least one processor, the third audio signal in accordance with a sixth parameter to generate a sixth signal; mixing, by the at least one processor, the first signal, the third signal, and the fifth signal; mixing, by the at least one processor, the second signal, the fourth signal, and the sixth signal; controlling, in the first operation mode, the fifth parameter in accordance with a fifth operation of a fifth operable element; controlling, in the first operation mode, the sixth parameter in accordance with a sixth operation different to the fifth operation; and controlling, in the second operation mode, the fifth parameter and the sixth parameter in accordance with the fifth operation. According to this aspect, after each parameter is adjusted, the first audio signal, the second audio signal, and the third audio signal are mixed by each of the first mixer and the second mixer. Thus, it is possible to generate two signals, one of which is generated by mixing the first audio signal, the second audio signal, and the third audio signal in a first mix ratio, and the other of which is generated by mixing the first audio signal, the second audio signal, and the third audio signal in a second mix ratio different from the first mix ratio.

In a specific example (seventh aspect) of any of the first to sixth aspects, the method includes providing a first output signal to a sound emitter, the first output signal being obtained by mixing the first signal and the third signal; and transmitting a second output signal to an information apparatus via a communication network, the second output signal being obtained by mixing the second signal and the fourth signal. According to this aspect, the first output signal is provided to the sound emitter, and a sound dependent on the first output signal is audible to a user of the audio processing apparatus. On the other hand, the second output signal is transmitted to an information apparatus that is separate from the audio processing apparatus. In other words, it is possible to generate the first output signal that is audible to the user and the second output signal for transmission to the information apparatus.

An audio processing apparatus according to one aspect (eighth aspect) of this disclosure includes: at least one memory configured to store instructions; and at least one processor configured to execute the instructions to: adjust a first audio signal in accordance with a first parameter to generate a first signal; adjust the first audio signal in accordance with a second parameter to generate a second signal; adjust a second audio signal in accordance with a third parameter to generate a third signal; adjust the second audio signal in accordance with a fourth parameter to generate a fourth signal; mix the first signal and the third signal; mix the second signal and the fourth signal; control, in a first operation mode, the first parameter in accordance with a first operation of a first operable element; control, in the first operation mode, the second parameter in accordance with a second operation different to the first operation; control, in the first operation mode, the third parameter in accordance with a third operation of a second operable element; control, in the first operation mode, the fourth parameter in accordance with a fourth operation different to the third operation; control, in a second operation mode, the first parameter and the second parameter in accordance with the first operation; and control, in the second operation mode, the third parameter and the fourth parameter in accordance with the third operation.

In the specific example (ninth aspect) of the eighth aspect, the audio processing apparatus includes a housing that accommodates the at least one memory and the at least one processor, wherein the first operation is an operation of a physical operable element provided within the housing, wherein the third operation is an operation of a physical operable element provided within the housing, wherein the second operation is an operation of a virtual operable element displayed on a display, and wherein the fourth operation is an operation of a virtual operable element displayed on the display. As described above, in the second operation mode, the first parameter and the second parameter are controlled to be linked to each other in accordance with the first operation. Thus, a physical operable element dedicated to adjustment of the second parameter (second operation) is not required for the audio processing apparatus.

As a result, compared to a configuration in which the audio processing apparatus is provided with a physical operable element for the second operation in addition to the first operable element for the first operation, it is possible to reduce a size of the housing of the audio processing apparatus.

The "physical operable element" is a tangible user interface with which a user can be contact in a real space. The "physical operable element" is, for example, an operable element such as a button, a switch, a knob, and a key. On the other hand, the "virtual operable element" is a virtual user interface implemented by software. The "virtual operable element" is, for example, a graphical user interface (GUI) such as an operable element displayed on a display.

In the specific example (tenth aspect) of the ninth aspect, the audio processing apparatus includes a selection operable element configured to select the first operation mode or the second operation mode, in which the selection operable element is a virtual operable element displayed on the display. According to this aspect, the selection operable element for selecting the first operation mode or the second operation mode is not required to be provided as a physical operable element on the housing. Thus, compared to a configuration in which the housing of the audio processing apparatus is provided with a physical operable element for selecting the operation mode, it is possible to reduce a size of the housing.

DESCRIPTION OF REFERENCE SIGNS

100 . . . audio system, 200 . . . communication network, 10 . . . audio processing apparatus, 11 . . . controller, 12 . . . storage device, 13 . . . communication device, 14 . . . operation console, 15 . . . signal processor, 16 . . . input-output interface, 20 . . . information processing apparatus, 21 . . . controller, 22 . . . storage device, 23 . . . communication device, 24 . . . operation device, 25 . . . display, 31 . . . sound receiver, 32 . . . sound emitter, 33 . . . game device, 41 . . . distribution apparatus, 42 . . . terminal apparatus, 51-*n* (51-1, 51-2, 51-3) . . . operation knob, 52*a*, 52*b*, 52*c* . . . control button, 53 . . . fader, 54 . . . operation knob, 60 . . . audio processor, 61-*n* (61-1, 61-2, 61-3) . . . input channel, 62-*n* (62-1, 62-2, 62-3) . . . adjuster, 63-*n* (63-1, 63-2, 63-3) . . . adjuster, 64 . . . first mix bus, 65 . . . second mix bus, 66 . . . output adjuster, 67 . . . switch, 70 . . . operation controller, 80 . . . setting image, 81-*n* (81-1, 81-2, 81-3) . . . selection button, 82-*n* (82-1, 82-2, 82-3) . . . adjustment bar, 83-*n* (83-1, 83-2, 82-3) . . . signal level image.

What is claimed is:

1. A computer-implemented method for controlling an audio processing apparatus, the method comprising:

adjusting, by at least one processor, a first audio signal in accordance with a first parameter to generate a first signal;

adjusting, by the at least one processor, the first audio signal in accordance with a second parameter to generate a second signal;

adjusting, by the at least one processor, a second audio signal in accordance with a third parameter to generate a third signal;

adjusting, by the at least one processor, the second audio signal in accordance with a fourth parameter to generate a fourth signal;

mixing, by the at least one processor, the first signal and the third signal;

mixing, by the at least one processor, the second signal and the fourth signal;

controlling, in a first operation mode, the first parameter in accordance with a first operation of a first operable element;

controlling, in the first operation mode, the second parameter in accordance with a second operation different to the first operation;

controlling, in the first operation mode, the third parameter in accordance with a third operation of a second operable element;

controlling, in the first operation mode, the fourth parameter in accordance with a fourth operation different to the third operation;

controlling, in a second operation mode, the first parameter and the second parameter in accordance with the first operation; and controlling, in the second operation mode, the third parameter and the fourth parameter in accordance with the third operation, wherein the controlling, in the second operation mode, the first parameter and the second parameter in accordance with the first operation comprises controlling, in the second operation mode, the first parameter and the second parameter to be linked to each other in accordance with the first operation, and wherein the controlling, in the second operation mode, the third parameter and the fourth parameter in accordance with the third operation comprises controlling, in the second operation mode, the third parameter and the fourth parameter to be linked to each other in accordance with the third operation, wherein the method further comprises:

in response to the second operation mode being changed to the first operation mode:

releasing a state in which the first parameter and the second parameter are linked to each other while maintaining a value of the second parameter at a point in time immediately before the second operation mode is changed to the first operation mode; and releasing a state in which the third parameter and the fourth parameter are linked to each other while maintaining a value of the fourth parameter at the point in time immediately before the second operation mode is changed to the first operation mode.

2. The method according to claim 1, further comprising:

in response to the first operation mode being changed to the second operation mode:

setting a value of the second parameter to a value of the first parameter at a point in time immediately before the first operation mode is changed to the second operation mode, and setting a value of the fourth parameter to a value of the third parameter at the point in time immediately before the first operation mode is changed to the second operation mode.

3. The method according to claim 1, comprising:

selecting, for each of a pair of the first parameter and the second parameter and a pair of the third parameter and the fourth parameter, an operation mode from among a plurality of operation modes including the first operation mode and the second operation mode.

4. The method according to claim 1, comprising:

adjusting, by the at least one processor, a third audio signal in accordance with a fifth parameter to generate a fifth signal;

adjusting, by the at least one processor, the third audio signal in accordance with a sixth parameter to generate a sixth signal;

mixing, by the at least one processor, the first signal, the third signal, and the fifth signal;

mixing, by the at least one processor, the second signal, the fourth signal, and the sixth signal;

controlling, in the first operation mode, the fifth parameter in accordance with a fifth operation of a fifth operable element;

controlling, in the first operation mode, the sixth parameter in accordance with a sixth operation different to the fifth operation; and controlling, in the second operation mode, the fifth parameter and the sixth parameter in accordance with the fifth operation.

5. The method according to claim 1, comprising:

providing a first output signal to a sound emitter, the first output signal being obtained by mixing the first signal and the third signal; and transmitting a second output signal to an information apparatus via a communication network, the second output signal being obtained by mixing the second signal and the fourth signal.

6. An audio processing apparatus comprising:

at least one memory configured to store instructions; and at least one processor configured to execute the instructions to:

adjust a first audio signal in accordance with a first parameter to generate a first signal;

adjust the first audio signal in accordance with a second parameter to generate a second signal;

adjust a second audio signal in accordance with a third parameter to generate a third signal;

adjust the second audio signal in accordance with a fourth parameter to generate a fourth signal;

mix the first signal and the third signal;

mix the second signal and the fourth signal;

control, in a first operation mode, the first parameter in accordance with a first operation of a first operable element;

control, in the first operation mode, the second parameter in accordance with a second operation different to the first operation;

control, in the first operation mode, the third parameter in accordance with a third operation of a second operable element;

control, in the first operation mode, the fourth parameter in accordance with a fourth operation different to the third operation;

control, in a second operation mode, the first parameter and the second parameter in accordance with the first operation;

control, in the second operation mode, the third parameter and the fourth parameter in accordance with the third operation;

control, in the second operation mode, the first parameter and the second parameter in accordance with the first operation by controlling, in the second operation mode, the first parameter and the second parameter to be linked to each other in accordance with the first operation;

control, in the second operation mode, the third parameter and the fourth parameter in accordance with the third operation by controlling, in the second operation mode, the third parameter and the fourth parameter to be linked to each other in accordance with the third operation; and in response to the second operation mode being changed to the first operation mode:

release a state in which the first parameter and the second parameter are linked to each other while maintaining a value of the second parameter at a point in time immediately before the second operation mode is changed to the first operation mode; and release a state in which the third parameter and the fourth parameter are linked to each other while maintaining a value of the fourth parameter at the point in time immediately before the second operation mode is changed to the first operation mode.

7. The audio processing apparatus according to claim 6, comprising:

a housing accommodating the at least one memory and the at least one processor, wherein the first operation is an operation of a physical operable element provided within the housing, wherein the third operation is an operation of a physical operable element provided within the housing, wherein the second operation is an operation of a virtual operable element displayed on a display, and wherein the fourth operation is an operation of a virtual operable element displayed on the display.

8. The audio processing apparatus according to claim 7, comprising:

a selection operable element configured to select the first operation mode or the second operation mode, wherein the selection operable element is a virtual operable element displayed on the display.

9. The audio processing apparatus according to claim 6, wherein the at least one processor is configured to execute the instructions to:

in response to the first operation mode being changed to the second operation mode:

set a value of the second parameter to a value of the first parameter at a point in time immediately before the first operation mode is changed to the second operation mode, and set a value of the fourth parameter to a value of the third parameter at the point in time immediately before the first operation mode is changed to the second operation mode.

10. The audio processing apparatus according to claim 6, wherein the at least one processor is configured to execute the instructions to:

select, for each of a pair of the first parameter and the second parameter and a pair of the third parameter and the fourth parameter, an operation mode from among a plurality of operation modes including the first operation mode and the second operation mode.

11. The audio processing apparatus according to claim 6, wherein the at least one processor is configured to execute the instructions to:

adjust a third audio signal in accordance with a fifth parameter to generate a fifth signal;

adjust the third audio signal in accordance with a sixth parameter to generate a sixth signal;

mix the first signal, the third signal, and the fifth signal;

mix the second signal, the fourth signal, and the sixth signal;

control, in the first operation mode, the fifth parameter in accordance with a fifth operation of a fifth operable element;

control, in the first operation mode, the sixth parameter in accordance with a sixth operation different to the fifth operation; and control, in the second operation mode, the fifth parameter and the sixth parameter in accordance with the fifth operation.

12. The audio processing apparatus according to claim 6, wherein the at least one processor is configured to execute the instructions to:

provide a first output signal to a sound emitter, the first output signal being obtained by mixing the first signal and the third signal; and transmit a second output signal to an information apparatus via a communication network, the second output signal being obtained by mixing the second signal and the fourth signal.

* * * * *